US012692444B2

(12) United States Patent
Finney

(10) Patent No.: US 12,692,444 B2
(45) Date of Patent: Jul. 28, 2026

(54) METHODS FOR BIOLOGICAL PROCESSING OF HYDROCARBON-CONTAINING SUBSTANCES AND SYSTEM FOR REALIZATION THEREOF

(71) Applicant: McFinney, LLC, St. Simons Island, GA (US)

(72) Inventor: Jerry Wayne Finney, Bloomfield, NM (US)

(73) Assignee: CarbonadeUSA, Corp., St. Simons Island (GA)

( * ) Notice: Subject to any disclaimer, the term of this patent is extended or adjusted under 35 U.S.C. 154(b) by 84 days.

(21) Appl. No.: 18/792,142

(22) Filed: Aug. 1, 2024

(65) Prior Publication Data

US 2025/0188359 A1 Jun. 12, 2025

Related U.S. Application Data

(63) Continuation of application No. 18/322,029, filed on May 23, 2023, now Pat. No. 12,084,618, which is a
(Continued)

(51) Int. Cl.
| | |
|---|---|
| *C10G 1/02* | (2006.01) |
| *B01D 5/00* | (2006.01) |
| *C02F 3/34* | (2023.01) |
| *C02F 11/02* | (2006.01) |
| *C02F 11/18* | (2006.01) |

(Continued)

(52) U.S. Cl.
CPC ............. *C10G 1/02* (2013.01); *B01D 5/0036* (2013.01); *B01D 5/009* (2013.01); *B01D 5/0093* (2013.01); *C02F 3/34* (2013.01); *C02F 11/02* (2013.01); *C02F 11/18* (2013.01); *C05F 17/20* (2020.01); *C05F 17/40* (2020.01); *C10G*

*1/002* (2013.01); *C10G 31/06* (2013.01); *C10G 31/08* (2013.01); *C10G 32/00* (2013.01);
(Continued)

(58) Field of Classification Search
CPC .......... C10G 1/02; C10G 1/002; C10G 31/06; C10G 31/08; C10G 32/00; B01D 5/0036; B01D 5/009; B01D 5/0093; B01D 2252/103; B01D 2257/2025; B01D 2257/30; B01D 2257/406; B01D 2258/0283; B01D 53/18; B01D 53/1418; C02F 3/34; C02F 11/02; C02F 11/18; C02F 2303/06; C02F 2305/04; C02F 2305/06; C05F 17/20; C05F 17/40; Y02W 10/20; Y02W 30/40
See application file for complete search history.

(56) References Cited

FOREIGN PATENT DOCUMENTS

UA 112720 * 3/2016

OTHER PUBLICATIONS

UA 112720 (Year: 2016).*

* cited by examiner

*Primary Examiner* — Prem C Singh
*Assistant Examiner* — Juan C Valencia
(74) *Attorney, Agent, or Firm* — Bradley Arant Boult Cummings LLP; Daniel E. Sineway, Esq.; Micah Hensley, Esq.

(57) ABSTRACT

The present disclosure is related to systems and methods for the biological processing of hydrocarbon-containing substances. The systems and methods can relate to pre-digestion of hydrocarbon-containing substances and further processing of the same to produce hydrocarbon fuels, fertilizer, and/or other products.

25 Claims, 8 Drawing Sheets

Related U.S. Application Data continuation of application No. 17/381,605, filed on Jul. 21, 2021, now Pat. No. 11,655,420, which is a continuation of application No. 16/090,983, filed as application No. PCT/US2018/050031 on Sep. 7, 2018, now Pat. No. 11,104,850.

(60) Provisional application No. 62/568,874, filed on Oct. 6, 2017, provisional application No. 62/555,410, filed on Sep. 7, 2017.

(51) Int. Cl.

| | | |
|---|---|---|
| *C05F 17/20* | (2020.01) | |
| *C05F 17/40* | (2020.01) | |
| *C10G 1/00* | (2006.01) | |
| *C10G 31/06* | (2006.01) | |
| *C10G 31/08* | (2006.01) | |
| *C10G 32/00* | (2006.01) | |

(52) U.S. Cl.

CPC ...... *C02F 2303/06* (2013.01); *C02F 2305/04* (2013.01); *C02F 2305/06* (2013.01)

100

START

BACTERIAL AND/
OR ENZYMATIC
PRE-DIGESTION
PROCESS
200

STORE AND PURIFY
NAPHTHA VAPORS
PROCESS
300

CONVERT
HYDROCARBON BY-
PRODUCT TO
FERTILIZER/CLEAN
SOLIDS PROCESS
400

END

400

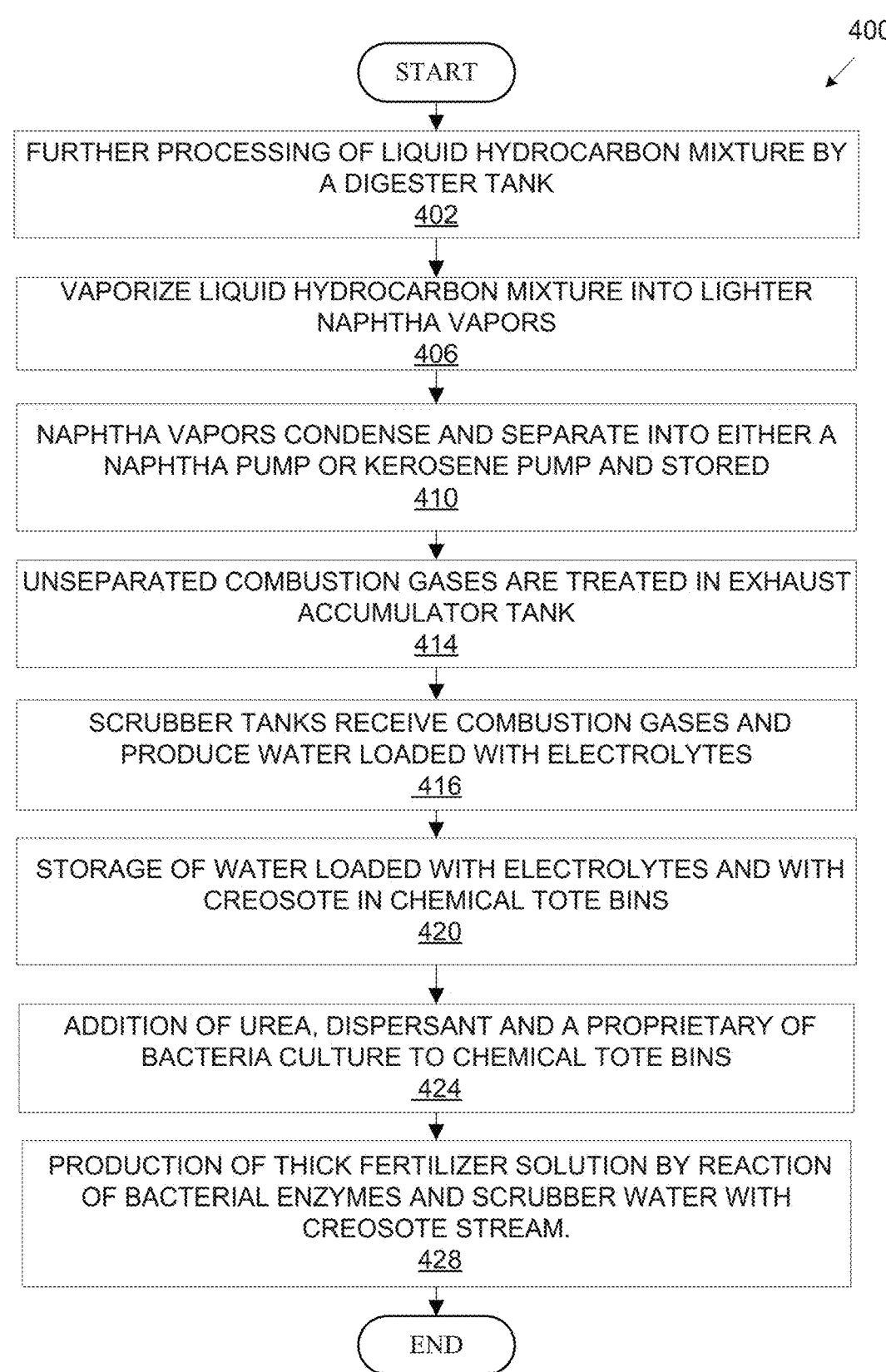

START

FURTHER PROCESSING OF LIQUID HYDROCARBON MIXTURE BY A DIGESTER TANK
402

VAPORIZE LIQUID HYDROCARBON MIXTURE INTO LIGHTER NAPHTHA VAPORS
406

NAPHTHA VAPORS CONDENSE AND SEPARATE INTO EITHER A NAPHTHA PUMP OR KEROSENE PUMP AND STORED
410

UNSEPARATED COMBUSTION GASES ARE TREATED IN EXHAUST ACCUMULATOR TANK
414

SCRUBBER TANKS RECEIVE COMBUSTION GASES AND PRODUCE WATER LOADED WITH ELECTROLYTES
416

STORAGE OF WATER LOADED WITH ELECTROLYTES AND WITH CREOSOTE IN CHEMICAL TOTE BINS
420

ADDITION OF UREA, DISPERSANT AND A PROPRIETARY OF BACTERIA CULTURE TO CHEMICAL TOTE BINS
424

PRODUCTION OF THICK FERTILIZER SOLUTION BY REACTION OF BACTERIAL ENZYMES AND SCRUBBER WATER WITH CREOSOTE STREAM.
428

END

METHODS FOR BIOLOGICAL PROCESSING OF HYDROCARBON-CONTAINING SUBSTANCES AND SYSTEM FOR REALIZATION THEREOF

CROSS REFERENCE TO RELATED APPLICATIONS

This application is a continuation of, and claims the benefit of and priority to, U.S. Non-Provisional patent application Ser. No. 18/322,029, filed May 23, 2023, and entitled "Method for Biological Processing of Hydrocarbon-Containing Substances and System for Realization Thereof," which is a continuation of U.S. Non-Provisional Patent Application No. U.S. Non-Provisional patent application Ser. No. 17/381,605, filed Jul. 21, 2021, and entitled "METHODS FOR BIOLOGICAL PROCESSING OF HYDROCARBON-CONTAINING SUBSTANCES AND SYSTEM FOR REALIZATION THEREOF," which is a continuation of, and claims the benefit of and priority to, U.S. Non-Provisional patent application Ser. No. 16/090, 983, filed Oct. 3, 2018, and entitled "Method for Biological Processing of Hydrocarbon-Containing Substances and System for Realization Thereof," which is a national stage entry of International Patent App. No. PCT/US18/50031, filed Sep. 7, 2018, and entitled "Method for Biological Processing of Hydrocarbon-Containing Substances and System for Realization Thereof," which claims the benefit of and priority under 35 U.S.C. § 119 to U.S. Provisional Patent Application No. 62/555,410, filed Sep. 7, 2017, and entitled "Method for Biological Processing of Hydrocarbon-Containing Substances and System for Realization Thereof," and U.S. Provisional Patent Application No. 62/568,874, filed Oct. 6, 2017, and entitled "Systems and Methods for Biological Processing of Hydrocarbon-Containing Substances," the disclosures of which are incorporated by reference in their entireties as if the same were fully set forth herein.

TECHNICAL FIELD

The present disclosure relates generally to systems and methods for the biological processing of hydrocarbon-containing substances.

BACKGROUND

With a growing population, it is predicted that energy consumption will continue to increase, resulting in the possibility of a shortage in natural resources. With this growing demand, versatile sources of energy with a low impact on the environment are needed. Advances in science and technology have enabled the exploration of alternative sources of energy production, such as the use of hydrocarbons. However, there are increasing concerns that hydrocarbon resources may be depleted and the development of a more efficient recovery process and/or use of available hydrocarbons is needed.

Additionally, a relatively high rate of waste production is emerging and waste management is increasingly becoming a concern as improvements in technology and recycling systems have not been developed to sufficiently counteract the increases in waste production. Further, if improperly treated, recycling of waste can lead to the production of a sludge containing highly toxic materials such as heavy metals and industrial solvents.

Therefore, there is a long-felt but unresolved need for a system or method that converts hydrocarbon-containing substances to various types of sustainable fuels, gases, and fertilizer, thus creating valuable products while improving and protecting the environment.

BRIEF SUMMARY OF THE DISCLOSURE

Briefly described, and according to one embodiment, aspects of the present disclosure generally relate to systems and methods for the biological processing of hydrocarbon-containing substances.

According to a first aspect, a method for transforming waste into hydrocarbon fuels including: A) creating a pre-digested coal slurry by mixing coal fines, water, urea, a culture of *Bacillus Firmus* bacteria and a dispersant agent in a pre-digestion tank; B) transferring the predigested coal slurry to a vacuum digester, including a first burner lance; C) heating the predigested coal slurry via the first burner lance, producing combustion gases and first naphtha vapors; D) condensing and storing the first naphtha vapors; E) heating the combustion gases via a second burner lance in an atmospheric digester, producing second naphtha vapors; and F) condensing and storing the second naphtha vapors.

According to a second aspect, the method of the first aspect or any other aspect, wherein: A) heating the predigested coal slurry further produces first creosote solids; and B) the method further includes transporting the first creosote solids to a chemical tote bin.

According to a third aspect, the method of the second aspect or any other aspect, wherein the method further includes creating a creosote mixture by mixing the first creosote with water, bacteria, and urea.

According to a fourth aspect, the method of the third aspect or any other aspect, wherein the method further include stirring the creosote mixture at regular intervals for at least a week to produce fertilizer.

According to a fifth aspect, the method of the fourth aspect or any other aspect, wherein: A) the combustion gases are first combustion gases; B) heating the first combustion gases via the second burner lance produces second combustion gases; and C) the method further includes transporting the second combustion gases to at least one scrubber tank for scrubbing the second combustion gases.

According to a sixth aspect, the method of the fifth aspect or any other aspect, wherein: A) the at least one scrubber tank produces scrubber water including electrolytes; and B) the method further includes adding the scrubber water to the creosote mixture.

According to a seventh aspect, the method of the sixth aspect or any other aspect, wherein the at least one scrubber tank is operatively connected to at least one ejector for scrubbing the second combustion gases.

According to an eighth aspect, the method of the seventh aspect or any other aspect, wherein the pre-digestion tank is about 500 bbls capacity and includes fiberglass.

According to ninth aspect, the method of the eighth aspect or any other aspect, wherein the dispersant is liquid dish soap or a chemical equivalent.

According to a tenth aspect, the method of the ninth aspect or any other aspect, wherein the predigested coal slurry has a pH of about 7-9.

According to an eleventh aspect, the method of the tenth aspect or any other aspect, wherein the predigested coal slurry includes about 0.66% by weight urea.

According to a twelfth aspect, the method of the eleventh aspect or any other aspect, wherein the predigested coal slurry includes about 3-6% by weight liquid dish soap.

According to a thirteenth aspect, the method of the twelfth aspect or any other aspect, wherein the predigested coal slurry includes about 150-300 ml of 15-15-15 plant fertilizer.

According to a fourteenth aspect, the method of the thirteenth aspect or any other aspect, wherein the method further include transferring the predigested coal slurry to a day tank.

According to a fifteenth aspect, the method of the fourteenth aspect or any other aspect, wherein the method further includes adding one or more of the group including coal fines, wood chips, and recycled carpet, to the predigested coal slurry in the day tank.

According to a sixteenth aspect, the method of the fifteenth aspect or any other aspect, wherein the method further includes adding 1-3 lbs of urea and 30-60 gallons of water to the predigested coal slurry in the day tank.

According to a seventeenth aspect, the method of the sixteenth aspect or any other aspect, wherein the method further includes pumping or draining the predigested coal slurry from the day tank to the vacuum digester.

According to an eighteenth aspect, a system for transforming waste into hydrocarbon fuels including: A) a pre-digestion tank for creating a predigested coal slurry by mixing coal fines, water, urea, a culture of *Bacillus Firmus* bacteria and a dispersant agent; B) a vacuum digester operatively connected to the pre-digestion tank and including a burner lance, the vacuum digester for heating the predigested coal slurry via the first burner lance, producing combustion gases and first naphtha vapors; C) a double-pipe heat exchanger fluidly connected to the vacuum digester for condensing the first naphtha vapors; D) a first naphtha tank fluidly connected to the double-pipe heat exchanger for storing the condensed first naphtha vapors; E) a second burner lance in an atmospheric digester fluidly connected to the vacuum digester, for producing second naphtha vapors from the combustion gases; F) a condenser fluidly connected to the atmospheric digester for condensing the second naphtha vapors; and G) a second naphtha tank for storing the condensed second naphtha vapors.

According to a nineteenth aspect, the system of the eighteenth aspect or any other aspect, wherein the system further includes a chemical tote bin for storing creosote solids produced by the vacuum digester or the atmospheric digester.

According to a twentieth aspect, the system of the nineteenth aspect or any other aspect, wherein the system further includes at least one scrubber tank for scrubbing the combustion gases.

According to a twenty-first aspect, the system of the twentieth aspect or any other aspect, wherein the at least one scrubber tank is operatively connected to at least one ejector for scrubbing the second combustion gases.

According to a twenty-second aspect, the system of the twenty-first aspect or any other aspect, wherein the pre-digestion tank is about 500 bbls capacity and includes fiberglass.

According to a twenty-third aspect, the system of the twenty-second aspect or any other aspect, wherein the system further includes at least one column operatively connected to the vacuum digester for transporting the second naphtha vapors to the condenser.

These and other aspects, features, and benefits of the claimed invention(s) will become apparent from the follow-ing detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 4 is a flowchart of an exemplary process for converting hydrocarbons to fertilizer, according to one embodiment of the present disclosure.

DETAILED DESCRIPTION

Figure 1:
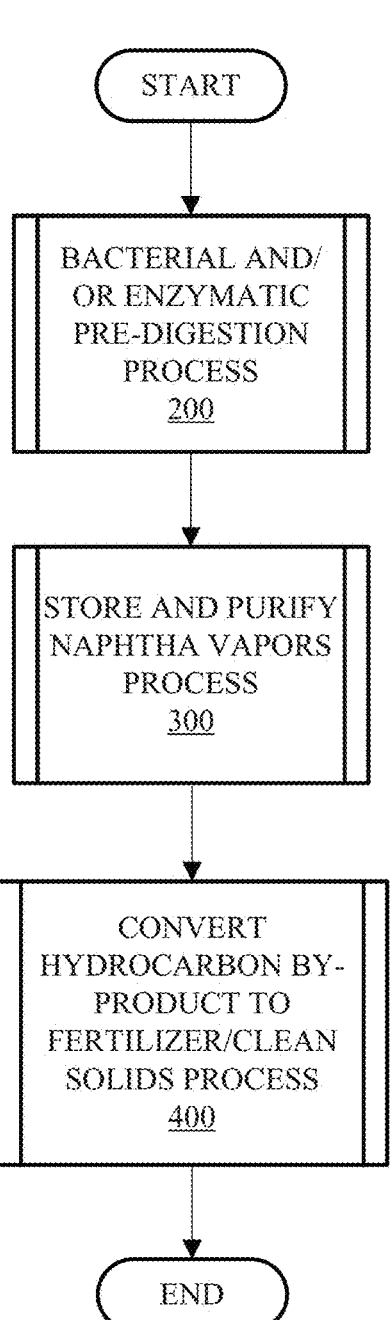
FIG. 1 illustrates an exemplary, high-level overview process, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As will be understood by one having ordinary skill in the art, the steps and processes described herein may operate concurrently and continuously, are generally asynchronous and independent, and are not necessarily performed in the order discussed.

These and other aspects, features, and benefits of the claimed disclosure(s) will become apparent from the following detailed written description of the embodiments and aspects taken in conjunction with the following drawings, although variations and modifications thereto may be effected without departing from the spirit and scope of the novel concepts of the disclosure.

Overview

An exemplary process begins with the pre-treatment of the hydrocarbon-containing substances. The hydrocarbon-containing substances may undergo hydrolysis and acidification in order to reduce large molecules and form organic acids. In various embodiments, a working mixture of a bacteria, urea, and water may be used break down (e.g. "loosen") the hydrocarbons.

Generally, the process continues with converting components of the hydrocarbon containing liquid mixture into gases and vapors. This process may take place in anaerobic digesters or the like and may run at any suitable temperature for the conversion of hydrocarbon containing liquids to various types of combustion gases. During this process, some molecules such as water, amines, and carbonates may resist breakdown and may be drained for various additional uses. In some embodiments, carbonaceous chemical creosote may be collected and converted to fertilizer (as discussed herein).

In various embodiments, the disclosed system includes: a reservoir (e.g., a pre-digestion tank) for preparing a working mixture and biodegradation of hydrocarbon-containing substances; various tank collectors for viscous substances; pumps; various digesters; heating reservoir; collectors for separated combustible fractions of hydrocarbons; pipelines for supplying and removing combustion products; collectors for residual materials; gas condensers; gas compressors and various tanks for purifying combustion products.

In various embodiments, the system may purify the combustion gases by a series of compressors and tanks. This process may continue with the use of gas scrubber tanks, or the like, that are efficiently and effectively designed to remove gas pollutants (e.g. ammonia, chlorine or sulfur compounds). In some embodiments, the gas scrubber tanks filled with water function by dissolving and/or absorbing the pollutants into the scrubbing liquid. In various embodiments, the scrubber tanks incorporate a recycle drum and pump to ensure removal of pollutants is efficiency achieved. Generally, gases may enter the scrubber tanks where it contacts the scrubbing fluid and captures the pollutants resulting with an end-product of purified water loaded with electrolytes. In various embodiments, the water loaded with electrolytes along with creosote, may be stored in chemical tote bins to which the above mentioned working mixture may be added to produce a fertilizer solution.

As will be understood, this disclosure plays no limitations on the types of tanks (e.g. surge tanks manufactured by Global Industrial, of Port Washington, NY), digesters (e.g. vacuum digesters manufactured by Alibaba, of China) compressors (e.g. gas compressors manufactured by Exterran, of Houston, TX) and pumps (e.g. supply pump manufactured by Pump Supply Inc, of Elgin, IL) used (and further discussed below).

Exemplary applications of the disclosed system and method generally include the use of the end-products (e.g. fertilizer, gases, and vapors). In various embodiments, markets for the end-products may include industries such as oil refineries (e.g. the use of naphtha streams due to low sulfur content) and agriculture (e.g. the use of fertilizer). As will occur to one having ordinary skill in the art, this disclosure places no limitations on the applications for the disclosed products of the systems and methods described herein.

EXEMPLARY EMBODIMENTS

Referring now to the figures, for the purposes of example and explanation of the fundamental processes and components of the disclosed systems and methods, reference is made to FIG. 1, which illustrates an exemplary, high-level overview process 100 of one embodiment of the present disclosure. As will be understood and appreciated, the exemplary, high-level overview process 100 shown in FIG. 1 represents merely one approach or embodiment of the present systems and methods. The various exemplary processes discussed in FIGS. 1-4 will further be discussed in association with FIGS. 5-8.

The current disclosure provides a process (and system) for converting waste materials (e.g., coal, carpet scraps, wood, lump coal, weeds, and the plastic parts of cell phones) into hydrocarbon fuels and fertilizer. The exemplary process 100 includes: a bacterial and/or enzymatic pre-digestion process 200; a storage and purification of naphtha vapors process 300; and a conversion of hydrocarbon by-products to fertilizer process 400. In various embodiments, process 200 generally may produce solid hydrocarbons and activated coal slurry. In some embodiments, process 300 may include the production of naphtha vapors via a catalytic reduction process which may be condensed, dewatered, and stored and/or purified. In some embodiments, process 400 may include converting hydrocarbon by-products into fertilizer, or other uses. Each of these processes will be discussed in turn.

Figure 2:
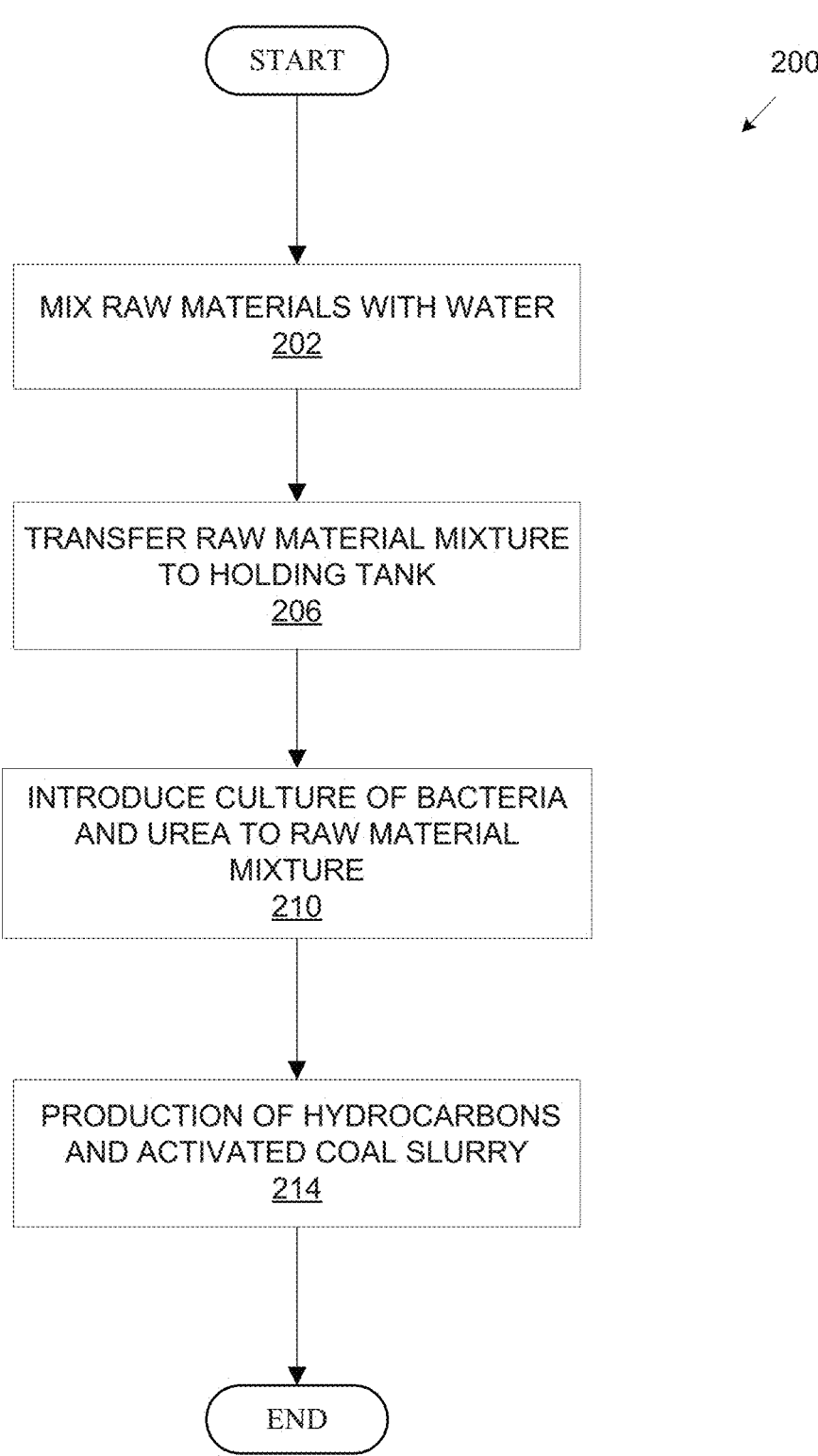
FIG. 2 is a flowchart of a pre-digestion process, according to one embodiment of the present disclosure.

Turning now to FIG. 2, a flowchart of a pre-digestion process 200 is shown in accordance to one embodiment of the present disclosure. The system begins at step 202, which includes mixing of raw materials, such as a slurry of coal fines, with water. In various embodiments, at step 206, the raw material mixture is introduced into a holding tank. In at least one embodiment, the raw material and water is mixed directly in the holding tank.

In some embodiments, the process continues at step 210, which includes adding a proprietary culture of bacteria, urea (or amines), and dispersant to the holding tank. This disclosure places no limitations on the type of bacteria (e.g., *Bacillus Firmus*) and dispersant agent (e.g., dawn or ivory soap) used. In various embodiments, the mixture may have a pH ranging from 7-9. In at least one embodiment, there is no external heating or cooling, and the process runs at ambient temperature and pressure. Further, in some embodiments, the mixture breaks down (e.g., "loosens") the hydrocarbons without agitation or further mixing (although in some embodiments, the mixture may be stirred at suitable intervals).

In various embodiments, at step 214, the bacterial culture multiplies and may produce a variety of enzymes (e.g. lipase), which attack the coal particles, dissolving and extracting some of the hydrocarbons while converting others to shorter chain hydrocarbons, proteins, or alcohols. In some embodiments, after an appropriate time interval, the bacteria and enzymes may extract some hydrocarbons, split others to shorter chain hydrocarbons, proteins or alcohols and generally weaken and deteriorate the structure of the coal fines, making it possible for further separation of the hydrocarbons from the remaining rock/mineral matrix of the coal. As will be understood from discussions herein, the time interval may be any suitable time interval such as one day, two days, one week, one month, etc.

After step 214, the "pre-digested" hydrocarbon mixture is further processed to produce naphtha vapors and fertilizer, as further discussed herein.

Figure 3:
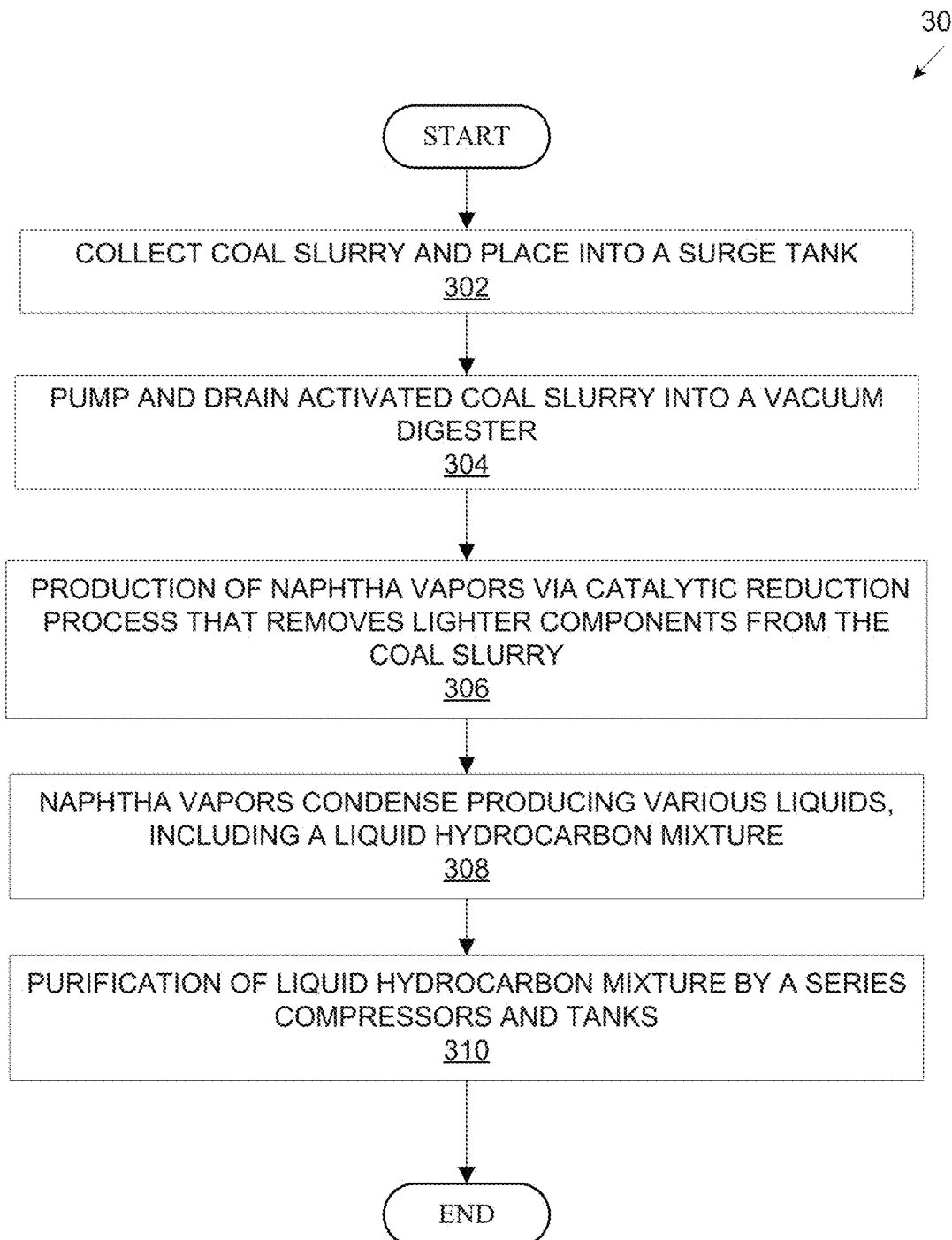
FIG. 3 is a flowchart of a storage and purification of naphtha vapors process, according to one embodiment of the present disclosure.

Turning now to FIG. 3, a flowchart of a storage and purification of naphtha vapors process 300 is shown in accordance with one embodiment of the present disclosure. Beginning with step 302, the system receives a coal slurry mixture (e.g. pre-digested mixture from FIG. 2) in a surge tank. In at least one embodiment, any free water is drawn off of the mixture for removal and urea is added and mixed into the contents.

At step 304, the coal slurry is pumped and/or drained into a vacuum digester where hydrocarbons are further converted to shorter chain hydrocarbons, proteins, and/or alcohols, and water is separated.

At step 306, by way of catalytic reduction, the lighter components from the coal slurry are removed producing naphtha vapors.

Continuing with the present process, at step 308, the naphtha vapors are condensed, producing various liquids including a liquid hydrocarbon mixture.

At step, 310, the liquid hydrocarbon mixture may be purified by a series of compressors and tanks.

FIG. 4 depicts a flowchart of an exemplary process 400 for converting hydrocarbons to naphtha vapors and fertilizer, according to one embodiment of the present disclosure.

The process begins at step 402, where a digester tank receives and processes the hydrocarbon mixture, such as a coal slurry mixture from the process associated with FIG. 2 or combustion gases from the process of FIG. 3. At step 406, the hydrocarbon mixture is vaporized into lighter naphtha vapors. The process continues at step 410, where the naphtha vapors are condensed and separated and transported to either a naphtha pump or kerosene pump and stored.

As will be understood, the digester tank at step 402 may not vaporize all of the gases produced from the hydrocarbon mixture and any remaining combustion gases are further processed. In various embodiments, the combustion gases are treated in an exhaust accumulator tank at step 414.

At step 416, a series of scrubber tanks purify and clean the combustion gases and produce water loaded with electrolytes. At step 420, the water loaded with electrolytes along with creosote, a carbonaceous material formed during process 300, may be stored in chemical tote bins. At step 424, an additional amount of urea, a dispersant agent, and a proprietary of bacteria culture is added to the chemical tote bins.

At step 428, a fertilizer solution is produced. In various embodiments, the production of the fertilizer solution at step 428 is initiated by the reaction of bacterial enzymes and scrubber water with creosote stream, further details of which will be discussed in association with description of FIGS. 7 and 8.

FIGS. 5-8 show exemplary components of the system discussed herein. Further, FIGS. 5-8 and discussions related thereto may help explain how exemplary processes discussed herein are completed via various system components.

Figure 5:
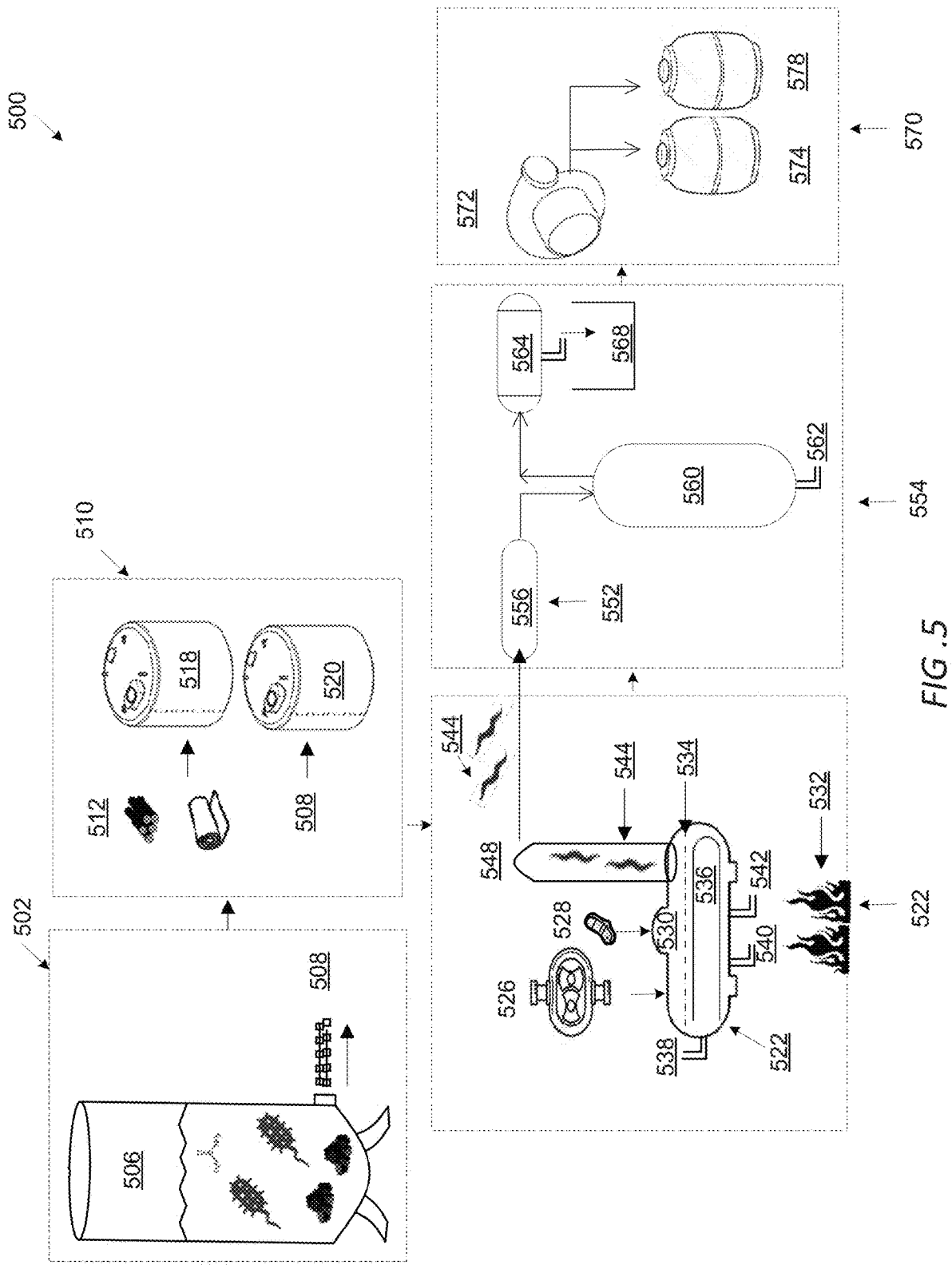
FIG. 5 illustrates various exemplary system components, according to one embodiment of the present disclosure.

Turning now to FIG. 5, which shows various exemplary components of the system used to complete the processes described herein. In the exemplary embodiment shown in FIG. 5, the system 500 includes: an enzymatic pre-digestion tank 506, a surge day tank 520, a tank 518, vacuum digester 530, a column 548, a condenser 556, a separator tank 560, a knockout pot 564, a gas compressor 572, and propane tanks 574, 578.

Generally, tank 506 is for preparing a working mixture (process 502) and is connected to tank 520 for further biodegradation (process 510) and a pump 526. In some embodiments, tank 520 is connected to vacuum digester 530 which is used for the collection of viscous substances 512, 508, and 528 via pump 526 (process 522). In some embodiments, vacuum digester 530 is connected to a heating reservoir 532 and a U-shaped pipe 536 for collecting combustion gases 538, overflow products 540, and creosote 542. In various embodiments, the vacuum digester 530 is connected to column 548 for separating lighter components from heavier components allowing the vaporized mixture to pass through condensers 556 and separator tank 560 which separates droplets of liquid having lower vapor pressure (process 554). In further embodiments, separator tank 560 is connected to a knockpot 564 and gas compressor 572 for the separation of vapors into individual components such as natural gas and propane 574, 578 (process 570).

In various embodiments, at process 502, a combination of slurry coal fines, water, and a proprietary culture of bacteria is introduced to the enzymatic pre-digestion holding tank 506, for breaking down the hydrocarbon-containing materials for further processing. In various embodiments, the holding tank 506 may be of any suitable size and constructed from any suitable material. In particular embodiments, the holding tank 506 may have a 500 bbls capacity, constructed from fiberglass, and may be enclosed with a roof.

In some embodiments, any suitable amount of urea (or amines) and a dispersant agent (e.g. dawn or ivory soap) may be added to promote mixing without agitation. Generally, the mixture will achieve a pH ranging from 7-9. In various embodiments, there is no external heating or cooling necessary, and the process may run at any suitable ambient temperature and pressure.

In various embodiments, the biodegradation of the coal fines may be initiated by any suitable bacteria (e.g. *Bacillus firmus*, etc.). In some embodiments, the mixture added to the coal fines may include bacteria, about 0.66% of urea by weight (e.g., at least one embodiment, with daily urea treatments), about 3-6% of liquid dishwasher soap (e.g. Dawn® or Ivory®) as an emulsifier, and about 150 mL-300 mL of 15-15-15 plant fertilizer (e.g., Miracle-Gro® or similar fertilizer with 15% nitrogen, 15% phosphorus, and 15% potassium by weight). In at least one embodiment, the mixture may be blended 50/50 with any suitable crude oil and/or engine oil. In some embodiments, during the pre-digestion of the coal fines, the bacterial culture multiplies and may produce a variety of enzymes (e.g. extra cellular lipase, etc.).

In particular embodiments, *Bacillus firmus* bacterial biomass is supplied to tank 506 to facilitate the biodegradation process in the amount of 0.2 wt. % with the number of colony forming units (CFU) equal to $5.07 \times 10^5$ per one gram of the biomass. Generally, in 24 to 48 hours, the CFU number increases to amount $8.15 \times 10^9$ per one gram of the biomass. In some embodiments, the bacteria may begin to synthesize exoenzymes of lipase, these enzymes may attack the coal particles and dissolve and extract some of the hydrocarbons while converting others. In various embodiments, after a suitable time interval, the bacteria and enzymes may extract some hydrocarbons, split others, and generally weaken and deteriorate the structure of the coal fines, making it possible for the vacuum digester 530 to separate the hydrocarbons from the remaining rock/mineral matrix of the coal.

In some embodiments, at process 510, the hydrocarbon and activated coal slurry 508 (from process 502) is pumped to a day tank 520. In some embodiments, any suitable amount of urea (e.g. 1-3 lbs) and water (e.g. 30-60 gal) is additionally added to tank 520. In various embodiments, coal fines, wood chips, and/or recycled carpet 512 may be placed into tank 518 and mixed with any suitable amount of urea (e.g. 1-3 lbs) and water (e.g. 30-60 gal). In various embodiments, tanks 520 and 518 may be of any suitable size and constructed from any suitable materials.

In various embodiments, at process 522, the activated coal slurry 508 is pumped/drained 526 to the vacuum digester 530 from the day tank 520. In some embodiments, materials 512 from tank 518 may be pumped/drained 526 to the vacuum digester 530. In one embodiment, carbonaceous materials (e.g., coal slurry 508, coal fines, wood chips, and/or recycled carpet 512, and/or cell phones (or portions thereof 528) are fed into the vacuum digester 530, which may contain an enclosed vessel fitted with a U-shaped diesel-fired burner lance 536.

In particular embodiments, this U-shaped tubular system within the digester 530 allows the movement of the carbonaceous materials and during this transit movement, the gasified product vapors are extracted under a constant vacuum. In some embodiments, a burner 532 is used to indirectly heat the carbonaceous materials and may not come into direct contact with the materials. In one embodiment, other solid feedstocks such as wood, lump coal, chopped carpet fibers, plastic bottles, weeds and cell phones 528 can be charged for reduction and consumption in the vacuum digester 520. In various embodiments, carbonaceous materials (508, 512, 528) are further converted to hydrocarbon fuel with the addition of urea and water. In some embodiments, the larger materials settle onto a support grid 534 located just above the firetube assembly. In further embodiments, various types of combustion gases (e.g. $CO_2$, CO, NOX, etc.) 538 may be produced and captured from the diesel-fueled burner lance 536.

Continuing with process 522, lighter components are liberated from carbonaceous materials and other feedstock (508, 512, 528) and may rise through any suitable column apparatus or apparatuses 548. In various embodiments, as the temperature inside the vacuum digester 530 rises, heavier hydrocarbons are liberated and may condense at double-pipe heat exchangers (not shown) and lighter components may rise through the column 548. In some embodiments, catalytic reduction may occur in vacuum digester 530. In some embodiments, via catalytic reduction, naphtha vapors 544 may be produced and may also rise through the column 548. In particular embodiments, column 548 may be packed with Raschig rings of any suitable dimension (e.g. 1 inch) and any suitable material (e.g. aluminum).

In some embodiments, a pipe line (not shown) extends from column 548 allowing naphtha vapors 544 and other vapors to proceed for further processing. In various embodiments, the pipeline extending from the column 548 may be of any suitable dimension (e.g. 2 inches) and constructed from any suitable materials. From the bottom of the vacuum digester 530, a drain 542, in various embodiments, removes creosote, while another drain 540 may be used to drain water, amines and carbonates.

In various embodiments, at process 554, the liberated naphtha vapors 544 may exit packed column 548 and proceed to a series of double-pipe water-cooled heat exchangers (not shown), where some components may condense and fall into a vertical tank 560. In various embodiments, any suitable condenser(s) and vertical tank apparatuses may be used for this process. In some embodiments, liquid products captured may include water, amines, olefin hydrocarbons, paraffinic hydrocarbons, possibly alcohols and ketones. As will be understood, when coal is dissolved, a wide variety of hydrocarbon products result.

In some embodiments, vapors that are too light to be efficiently condensed with a cooling water service (e.g., at the double-pipe water-cooled heat exchangers), may proceed through a knockout pot 564 (final liquid trap) to reach a gas compressor 572, a motor driven positive-displacement unit. In various embodiments, any suitable knockout pot apparatus may be used for this process. In further embodiments, any suitable gas compressor apparatus that may reach any suitable ambient atmospheric pressure (e.g. 125 psig discharge) may be used for this process. In various embodiments, the compressed vapors may go to storage bullet tanks 574 and 578.

In some embodiments, there is manual drainage from the knockout pot 564 and "floating mud" (e.g. lithium cobalt, copper, nickel compounds) are stored in a settling tank with a skimmer 568.

In various embodiments, the gas compressor 572 is strong enough to pull a vacuum (about 18 Hg) back to the vacuum digester 530, and generally pulls the naphtha vapors forward through the double-pipe heat exchangers and the receiver/knockout pot 564. In some embodiments (not shown), the system includes a saturates gas plant, to clean and separate the vapors into individual components such as natural gas and propane (which may also be stored in tanks 574 and 578).

Figure 6:
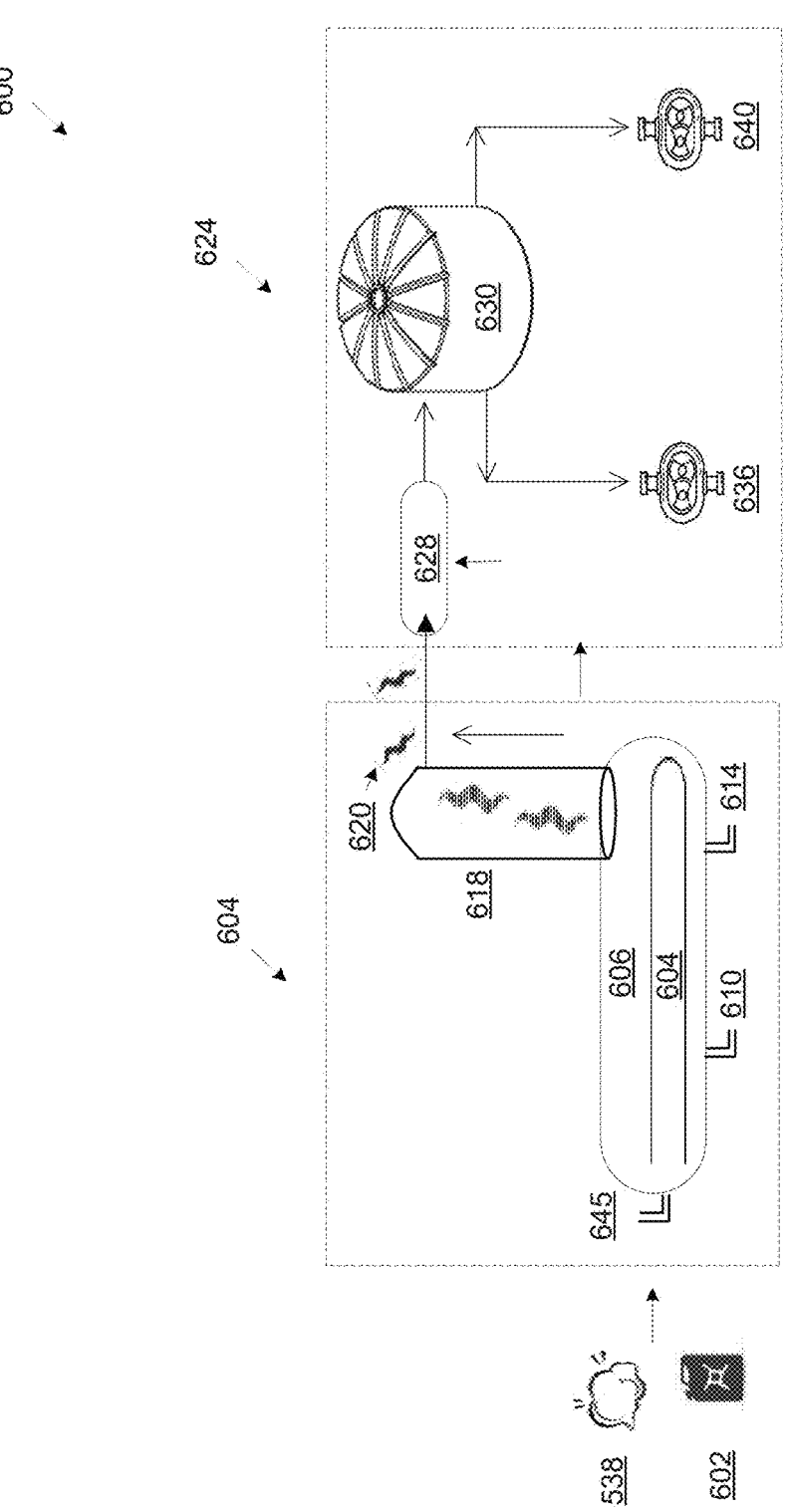
FIG. 6 illustrates exemplary system components, according to one embodiment of the present disclosure.

FIG. 6 depicts additional system components, according to one embodiment of the present disclosure. In the exemplary embodiment shown in FIG. 6, the system includes: an atmospheric digester lance 604, an atmospheric digester 606, column 618, condensers 628, separator tank 630, kerosene pump 636 and naphtha pump 640. Generally, the atmospheric digester 606 is connected column 618 for the purification of vapors (process 604). In some embodiments, column 618 is connected to condensers 628 and a separator tank 630 where vapors are further separated by either a kerosene pump 636 or naphtha pump 640 (process 624).

In various embodiments, at process 604, combustion gases from the diesel-fueled burner lance 604 may be captured. Continuing with process 604, combustion gases 538, diesel fuel 602 may accumulate into the atmospheric digester 606. From the bottom of the atmospheric digester 606, multiple drains, in various embodiments, remove creosote 610, while another drain 614 may be used to drain water, amines, and carbonates. In some embodiments, the mixture of gases are evaporated allowing lighter naphtha vapors 620 and/or lighter components to be liberated and rise through to any suitable packed column apparatus 618. In at least one embodiment, combustion gases 645 may be captured and transported to a scrubber system discussed herein.

At process 624, in particular embodiments, the naphtha vapors 620 from the packed column 618 proceed to a series of double-pipe water-cooled heat exchangers 628, where some components condense and travel into a separator tank 630. In various embodiments, any suitable separator tank (e.g. vertical or horizontal orientation) constructed from any suitable material with a wide ranging pressure requirements may be used for this process. In some embodiments, separator tank 630 may be fitted with a strainer (not shown) that filters content that may arrive and/or depart the tank. In one embodiment, separation and/or filtering of the content may be based on density, force, temperature, direction, velocity and/or pressure. In various embodiments, tank 630 is connected to kerosene pump 636 and naphtha pump 640 which may further separate naphtha vapors from kerosene. The naphtha vapors and/or kerosene may then be stored in suitable tanks.

Figure 7:
FIG. 7 illustrates exemplary system components, according to one embodiment of the present disclosure.

FIG. 7 shows exemplary system components, including: an exhaust accumulator tank 704, ejectors (712, 716), scrubber tanks (722, 726), scrubber recycle drum 734, scrubber recycle pump 738 and internal combustion engine 742. Generally, the exhaust accumulator tank 704 (process 706) is connected to ejectors 712, 716, which are used to pump gases and/or vapors to scrubber tanks 722, 726 (process 710). In some embodiments, scrubber tanks 722, 726, produce water loaded with electrolytes and are connected to scrubber recycle drum 734, scrubber recycle pump 738, and internal combustion engine 742 (process 730).

In various embodiments, at process 706, the system captures the combustion exhaust gases (538, 540) and treats them with $CO_2$ produced by the burning of diesel at the rate of 5 gal/hr, water that may be provided the scrubber tanks (722, 726) and any unburned hydrocarbons or emissions that may be pulled by vacuum to the exhaust accumulator tank 704. In various embodiments, the scrubber tanks (722, 726) may roughly be 3,000-7,000 gal in capacity and sealed. At process 710, the compounds from exhaust accumulator tank 704 are transported to ejectors (712, 716). In some embodiments, exhaust gases from ejectors (712, 716) are transported to a pair of scrubber tanks (722, 726), filled with water and amines. In various embodiments, any suitable scrubber tank (e.g. venture, orifice, spray tower, cyclonic spray tower, dynamic, tray tower, etc.) may be used for this process.

In at least one embodiment, tank 722 is fitted with an electric grid 720. In various embodiments, the design of the electric grid 720 includes a series of PVC pipes spaced about 1 to 2 inches apart and any suitable wire constructed from any suitable material (e.g. cooper). In particular embodiments, copper wire may be wrapped around the PVC pipe in any suitable orientation allowing water to circulate around each individual wire. In some embodiments, the electric grid 720 provides an electric field to encourage the reduction of hydrogen gas into an active ionized species, which will react to drive the carbonate and amine reactions. In some embodiments, the exhaust gases react with the amine-water solution and produce urea and/or ammonia, while the $CO_2$ turns into carbonate species in the water. In some embodiments, the scrubber system may produce some hydrogen and methane, which are used to help fuel the gasoline engine, which may drive the scrubber pump 738. In at least one embodiment, at higher loadings, the scrubber produces nearly enough hydrogen and methane to displace the gasoline and fuel the engine 742 completely on scrubber gas. In a particular embodiment, a trace amount of gasoline remains in the manifold to power the engine.

In various embodiments, scrubber water overflows into a surge tank 726, where it feeds the scrubber pump 728. In at least one embodiment, the system includes a scrubber recycle pump 734 that drives two ejector venturi (712, 716) to help facilitate the removal of particulate matter, which then creates a vacuum to pull the exhaust vapors to the accumulator vessel 704. In various embodiments, the system recirculates scrubbing liquid in order to decrease the solid content of the scrubbing liquid. In some embodiments, the scrubber water eventually accumulates electrolytes, which can saturate and precipitate in the scrubber, impacting its operation. Therefore, before the scrubber water reaches saturation, in at least one embodiment, the scrubber may be dumped and the accumulated electrolytes may be used in the creosote conversion process (discussed herein).

Figure 8:
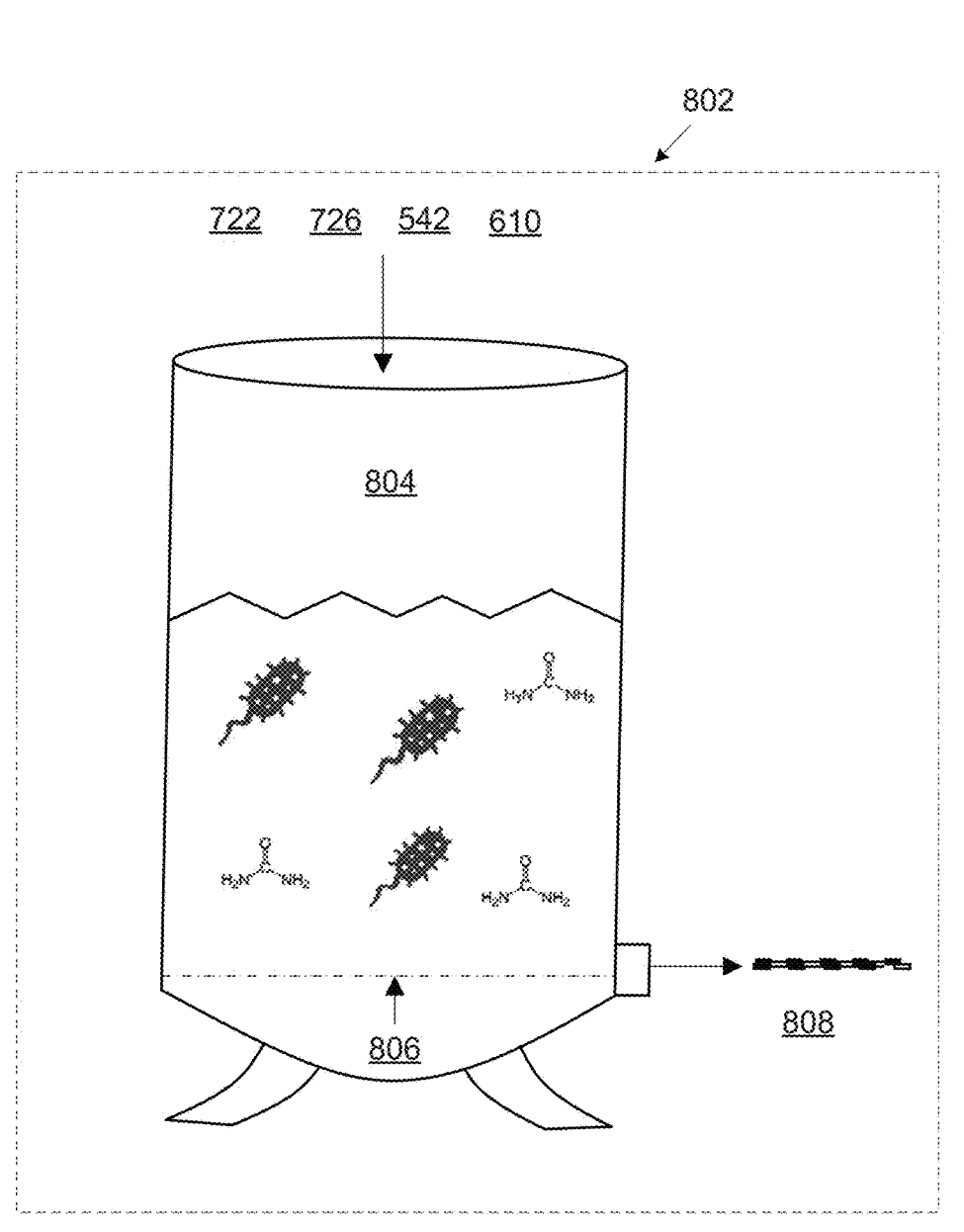
FIG. 8 illustrates an exemplary chemical tote bin component, according to one embodiment of the present disclosure.

FIG. 8 shows an exemplary chemical tote 804, which will be described in conjunction with process 802. In various embodiments, at process 802, scrubber water loaded with electrolytes from tanks 722, 726 along with creosote (542, 610) is converted into fertilizer. In some embodiments, the creosote stream from the digester is stored in any suitable chemical tote bin 804. In particular embodiments, the chemical tote bin 804 may be a four-foot-cubical polypropylene tank with a threaded top lid and a bottom valve.

In various embodiments, creosote (542, 610) is mixed with water from the scrubber tanks (722, 726), urea, dispersant and a bacteria culture (e.g. *Bacillus Firmus*). In some embodiments, the bacterial enzymes and scrubber water react with the creosote stream to create a thick fertilizer solution, rich in nitrates, carbonates, and mineral nutrients. In various embodiments, the mixture may have five to ten gallons a day drained from the bottom valve and returned through the top lid, in effect a stirring/mixing procedure. In some embodiments, the batch is turned once or twice a day for one to two weeks, occasionally adding more urea as needed. In particular embodiments, after about two weeks, the urea stops making nitrates and starts making ammonia, which ammonia odor is a signal that conversion is complete and the fertilizer is ready to sell.

While various aspects have been described, additional aspects, features, and methodologies of the claimed disclosure will be readily discernible from the description herein, by those of ordinary skill in the art. Many embodiments and adaptations of the disclosure and claimed embodiments other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed disclosure. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed disclosure. In addition, some steps may be carried out simultaneously, contemporaneously, or in synchronization with other steps.

The embodiments were chosen and described in order to explain the principles of the claimed disclosure and their practical application so as to enable others skilled in the art to utilize the inventions and various embodiments and with various modifications as are suited to the particular use contemplated. Alternative embodiments will become apparent to those skilled in the art to which the claimed disclosure pertain without departing from their spirit and scope. Accordingly, the scope of the claimed disclosure is defined by the appended claims rather than the foregoing description and the exemplary embodiments described therein.

What is claimed is:

1. A method comprising:

adding a bacteria to a mixture comprising coal to create a predigested coal slurry;

transferring the predigested coal slurry to a digester;

heating the predigested coal slurry in the digester to thereby produce naphtha vapors;

condensing the naphtha vapors to produce condensed naphtha vapors; and storing the condensed naphtha vapors.

2. The method of claim 1 further comprising adding one or more waste materials to the predigested coal slurry, the one or more waste materials comprising plastic.

3. The method of claim 1 further comprising holding the predigested coal slurry in a pre-digestion tank at ambient temperature.

4. The method of claim 1, wherein heating the predigested coal slurry comprises indirectly applying heat to the predigested coal slurry via a burner.

5. The method of claim 1, wherein the mixture further comprises urea.

6. The method of claim 1, wherein the mixture further comprises a dispersant agent.

7. The method of claim 6, wherein the dispersant agent comprises liquid dish soap or a chemical equivalent thereof.

8. The method of claim 7, wherein the dispersant agent comprises liquid dish soap in a concentration range of about 3-6% by weight of the predigested coal slurry.

9. The method of claim 1, wherein:

heating the predigested coal slurry further produces first creosote solids; and the method further comprises transporting the first creosote solids to a chemical tote bin.

10. The method of claim 9, wherein:

the bacteria is a first bacteria, and the method further comprises creating a creosote mixture by mixing the first creosote solids with an amount of water, a second bacteria, and an amount of urea.

11. The method of claim 10, wherein the method further comprises stirring the creosote mixture at regular intervals to produce fertilizer.

12. The method of claim 9, wherein:

the digester is a first digester, the condensed naphtha vapors are first condensed naphtha vapors, heating the predigested coal slurry in the first digester further produces combustion gases, and the method further comprises:

heating the combustion gases in a second digester to thereby produce second naphtha vapors;

condensing the second naphtha vapors to produce second condensed naphtha vapors; and storing the second condensed naphtha vapors.

13. The method of claim 12, wherein:

the combustion gases are first combustion gases, heating the first combustion gases further produces second combustion gases, and the method further comprises transporting the second combustion gases to at least one scrubber tank for scrubbing the second combustion gases.

14. The method of claim 13, wherein the bacteria is a first bacteria and the method further comprises:

creating a creosote mixture by mixing the first creosote solids with an amount of water, a second bacteria, and an amount of urea;

producing scrubber water in the at least one scrubber tank, the scrubber water comprising electrolytes; and adding the scrubber water to the creosote mixture.

15. The method of claim 14, wherein the at least one scrubber tank is operatively connected to at least one ejector for scrubbing the second combustion gases.

16. The method of claim 1, wherein the predigested coal slurry has a pH of about 7-9.

17. The method of claim 1, wherein the predigested coal slurry includes about 0.66% by weight urea.

18. The method of claim 1, wherein the predigested coal slurry further includes 15-15-15 plant fertilizer.

19. The method of claim 1 further comprising:

transferring the predigested coal slurry to a day tank; and adding one or more of coal fines, wood chips, or recycled carpet to the predigested coal slurry in the day tank.

20. The method of claim 19 further comprising adding an amount urea and an amount of water to the predigested coal slurry in the day tank.

21. The method of claim 20 further comprising pumping or draining the predigested coal slurry from the day tank to the digester.

22. A system for transforming waste into hydrocarbon fuels, the system comprising:

a pre-digestion tank configured to create a predigested coal slurry by combining coal and a first bacteria;

a digester operatively connected to the pre-digestion tank, the digester being configured to heat the predigested coal slurry to thereby produce naphtha vapors;

a heat exchanger fluidly connected to the digester, the heat exchanger being configured to condense the naphtha vapors to produce condensed naphtha vapors;

one or more naphtha tanks fluidly connected to the heat exchanger, at least a first naphtha tank of the one or more naphtha tanks being configured to store the condensed naphtha vapors; and a chemical tote bin configured to receive creosote solids produced by the digester, an amount of water, a second bacteria, and an amount of urea to thereby create a creosote mixture.

23. The system of claim 22 further comprising a waste source configured to charge one or more waste materials into the digester, the one or more waste materials comprising plastic.

24. The system of claim 22, wherein:

the digester is a first digester, the heat exchanger is a first heat exchanger, the naphtha vapors are first naphtha vapors, the condensed naphtha vapors are first condensed naphtha vapors, the digester is configured to heat the predigested coal slurry to further produce combustion gases, and the system further comprises:

a second digester fluidly connected to the first digester, the second digester being configured to produce second naphtha vapors from the combustion gases; and a second heat exchanger fluidly connected to the second digester, the second heat exchanger being configured to condense the second naphtha vapors to produce second condensed naphtha vapors, wherein at least a second of the one or more naphtha tanks is configured to store the second condensed naphtha vapors.

25. The system of claim 24 further comprising:

at least one conduit operatively connected to the second digester for transporting the second naphtha vapors to the second heat exchanger; and at least one scrubber tank for scrubbing the combustion gases, the at least one scrubber tank being operatively connected to at least one ejector for scrubbing second combustion gases produced by the second digester.

* * * * *